Nov. 19, 1946.  F. E. BLAIR ET AL  2,411,411
VEHICLE TOWING DEVICE
Filed May 26, 1945  2 Sheets-Sheet 1
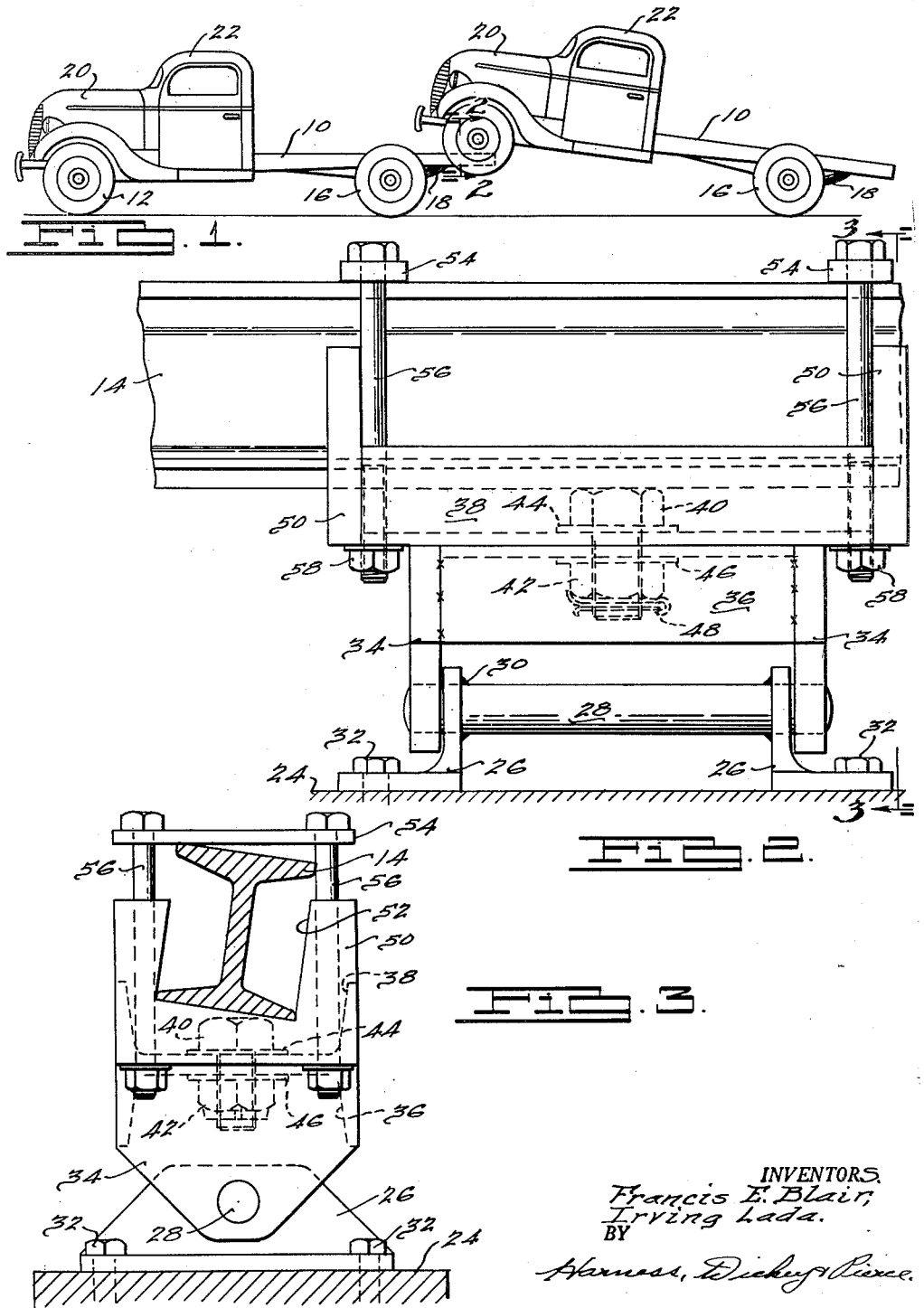
INVENTORS.
Francis E. Blair,
Irving Lada.
BY
Harness, Dickey & Pierce.
ATTORNEYS.

Nov. 19, 1946.   F. E. BLAIR ET AL   2,411,411
VEHICLE TOWING DEVICE
Filed May 26, 1945   2 Sheets-Sheet 2

INVENTORS.
Francis E. Blair,
Irving Lada.
BY
Harness, Dickey & Pierce
ATTORNEYS.

Patented Nov. 19, 1946

2,411,411

UNITED STATES PATENT OFFICE 2,411,411

VEHICLE TOWING DEVICE

Francis E. Blair, Van Dyke, and Irving Lada, Detroit, Mich.

Application May 26, 1945, Serial No. 596,008

5 Claims. (Cl. 280—33.1)

This invention relates to towing devices to enable one vehicle to tow another, and has for its principal object the provision of a device of this character that is simple in construction, efficient in operation and economical to build.

Objects of the invention include the provision of a vehicle towing device adapted to support the front end of a towed vehicle upon the rear end of a towing vehicle and so constructed and arranged as to permit all necessary movements of the towed vehicle with respect to the towing vehicle occasioned in the rounding of curves, passing over irregularities in the road surface etc.; the provision of a device of the type described adapted to be mounted upon the rear end of the towing vehicle and to be clamped to the front axle of the towed vehicle, including parts pivotable with relation to each other about a horizontal axis extending transversely under the vehicles and about an approximately vertical axis, thereby providing for universal movement of the towed vehicle with respect to the towing vehicle; the provision of a construction as above described in which the parts secured together for movement about a vertical axis include a pair of channel members secured in back-to-back relationship with respect to each other; and the provision of a device of the type described that may be formed from standard structural elements.

The above being among the objects of the present invention the same consists in certain novel features of construction and combinations of parts to be hereinafter described in reference to the accompanying drawings, and then claimed, having the above and other objects in view.

In the accompanying drawings which illustrate suitable embodiments of the present invention and in which like numerals refer to like parts throughout the several different views, Fig. 1 is a side elevational view illustrating a pair of motor vehicles one of which is mounted upon the other in towing relation with respect thereto by means of a device constructed in accordance with the present invention;

Fig. 2 is an enlarged transverse sectional view taken on the line 2—2 of Fig. 1 and illustrating the device of the present invention in front elevation;

Fig. 3 is a transverse sectional view taken on the line 3—3 of Fig. 2 and illustrating the device of the present invention in end elevation;

Figure 4:
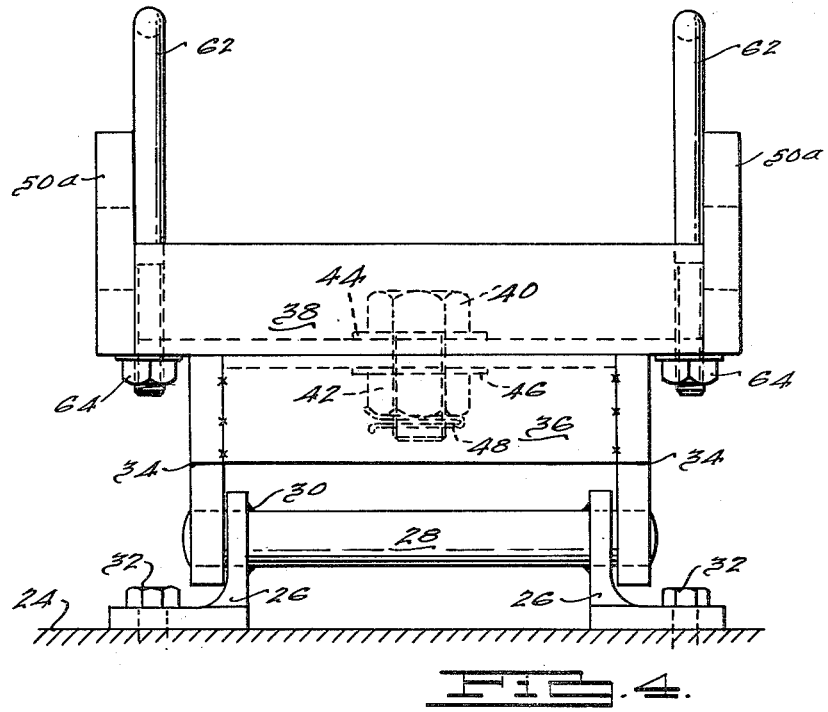
Fig. 4 is a front elevational view of a slightly modified form of construction; and, Fig. 5 is an end elevational view of the construction shown in Fig. 4.

The present invention relates to that type of device by means of which a vehicle to be towed may be positioned with its front end supported upon the rear end of the vehicle which is to tow it so that the towed vehicle may follow the towing vehicle in caster-like relation with respect thereto. Thus by the use of the present invention one driver for the towing vehicle may deliver the towing vehicle and the towed vehicle to a point of destination. It will be appreciated that more than one towed vehicle may be towed by the towing vehicle, each towed vehicle in such case being supported with its front end resting on the rear end of the preceding vehicle. Only one towed vehicle is shown in Fig. 1 simply as a matter of illustration, the application of additional towed vehicles being apparent to those skilled in the art. It might be noted that in the common parlance of the trade when a towed vehicle is mounted for towing as above explained and as illustrated in Fig. 1 the towed vehicle is commonly said to be given a pick-a-back ride, which is itself illustrative of the mounting between the two vehicles. It will also be understood that the above described method of towing a vehicle is not applicable for use in connection with motor vehicles of the pleasure type for the towing vehicle, but is commonly employed in connection with trucks or other types of vehicles with or without a cab but without a body, so that the rear end of the frame of the towing vehicle is unobstructed and therefore conditioned to receive the front end of the towed vehicle thereof. On the other hand the type of vehicle being towed is unimportant if no other vehicle is in turn to be towed in like manner by it, and in such case it may be a pleasure or other type of vehicle provided with a complete body.

As a matter of illustration in Fig. 1 the towing vehicle and the towed vehicle are shown as being of identical construction, each comprising a conventional frame structure 10 supported at its front end by the usual steerable front wheels 12 by means of a conventional axle (illustrated at 14 in Figs. 2 and 3) and conventional springs (not shown). The rear ends of the vehicles are supported by the usual driving wheels 16 which are connected to the corresponding frames 10 by means of a conventional driving axle structure (not shown) and semi-elliptic leaf springs 18. Each vehicle is provided at its forward end with a conventional hood 20 within which a conventional automotive power plant (not shown) is housed in a conventional manner and connected to the rear axle in a conventional manner. In the particular case shown each vehicle is provided with a cab 22 of conventional construction and which is relatively short so as to leave the bulk of the frame 10 exposed rearwardly from it for reception of a suitable type of load-carrying body.

The device of the present invention may be mounted upon the rear end of the frame 10 of the towing vehicle in any suitable manner. For instance it may be bolted directly to the rear cross member of the frame 10 or, if desired, it may be mounted upon a plank, bar, or the like extending transversely of the length of the frame 10 and secured to the upper surface of the rear end portion thereof in any suitable manner. This last form of mounting for the device of the present invention is usually preferred and such plank or crossbar is indicated generally at 24 in Figs. 2 and 3.

As brought out in Figs. 2 and 3 the device of the present invention includes a pair of angle bracket members 26 connected together in opposed and spaced relationship by means of a cylindrical pin or shaft 28, the opposite ends of which project through and beyond the upwardly directed flanges of the brackets 26 and are suitably fixed thereto as by welding, as indicated at 30, thus to provide a one-piece bracket structure. The brackets 26 are removably secured by bolts or the like 32 to the plank or bar 24 with the pin or shaft 28 horizontal and transverse to the length of the towing vehicle. The brackets 26 may be conveniently formed from short lengths of conventional structural angles and are so shown.

Each end of the pin or shaft 28 which projects beyond its corresponding bracket 26 provides a pintle which pivotally receives thereon the lower end of a plate member 34, the plate members 34 being arranged with their planes of thickness parallel to each other and parallel to the longitudinal center line of the towing vehicle when mounted thereon. Extending between the upper ends of the plate members 34 and suitably fixed thereto as by welding or the like is a downwardly opening channel sectioned member 36 which may be conveniently formed, as shown, from a relatively short length of commercial channel iron. When the member 36 is in its normal position of operation the flat web of the channel is uppermost and horizontal and the upper ends of the plates 34 are preferably brought into flush relationship with respect thereto when being secured thereto. Thus the member 36 and the plates 34 are mounted for a pivotal movement about the axis of the shaft or pin 28.

An upwardly opening channel sectioned member 38, preferably formed of a length of commercial channel iron, of greater length than the member 36 is positioned in flat contacting relationship upon the upper face of the member 36. Preferably it is the same width as the member 36 and its ends project equal distances beyond the corresponding plate members 34. It is pivoted to the member 36 for movement about an axis extending perpendicularly with respect to the planes of the contacting faces of the members 36 and 38, and midway the length and width of such faces, by means of a bolt or threaded pin 40 which projects down through the contacting webs of both the members 36 and 38 and below the web of the member 36 receives a nut 42 thereon. A washer 44 is preferably positioned under the head of the bolt 40 and a washer 46 is preferably positioned under the nut 42. The nut 42 is drawn up sufficiently to maintain the opposed faces of the members 36 and 38 in substantial contact with each other but not so tight as to prevent the member 38 from swiveling on the member 36 about the axis of the bolt 40. A cotter pin 48 is preferably projected through the bolt 40 and through the outer end of the nut 42 so as to prevent the nut 42 from working loose because of relative pivotal movement between the members 36 and 38 in service.

Plate members 50 extending in flat relation across the opposite ends of the member 38 are suitably fixed thereto as by welding and project upwardly above the upper edge of the member 38 as shown. In the particular construction illustrated in Figs. 2 and 3 each member 50 is provided with a notch 52 therein which opens upon the upper edge of such member 50. The notches 52 have straight sides and bottoms, the latter of which are arranged in perpendicular relationship with respect to the sides. The width of the notches 52 is sufficiently greater than the width of the bottom flange of the front axle 14 of the towed vehicle as to enable such flange to be received therein against the bottom walls of the notches. Preferably and as brought out in Fig. 3 the notches 52 are arranged at such an angle with respect to the vertical center line of the corresponding member 38 that when the bolt 40 is arranged with its axle vertical the bottom face of the axle 14 will rest in flat contact relationship with respect to the bottom of the notch 52 to compensate for the angle which the towed vehicle assumes with respect to the ground.

The axle 14 of the towed vehicle may be clamped in the notches 52 of the members 50 by any suitable means, the particular means shown in Figs. 2 and 3 by way of illustration comprising a clamping bar 54 extending transversely over the axle substantially vertically above but slightly inwardly spaced from each end member 50, and bolts 56 projected downwardly through each end of each clamping bar 54 outwardly beyond the front and rear faces of the axle 14 and down through the bottom web of the member 38 outwardly of the corresponding end member 34. Each bolt 56 receives a nut 58 thereon below the member 38 and which nuts cooperate with the bolts 56 and clamping bars 54 to securely clamp the axle 14 in position.

It will be appreciated from the above that the pivotal connection afforded by the pin or shaft 28 between the towing vehicle and the towed vehicle permits the towed vehicle to hinge about a horizontal axis with respect to the towing vehicle whereby to compensate for any change in angularity between the two vehicles caused by road irregularities or the like and without placing any strain on the towing device because of such movement. The pivotal connection afforded by the bolt 40 permits the towed vehicle to hinge about a vertical line with respect to the towing vehicle so as to cause the towed vehicle to follow the towing vehicle in caster-like relationship around curves or the like without placing any strain upon the towing device because of such movement. Thus the device of the present invention provides a universally movable connection between the towing vehicle and the towed vehicle permitting the towed vehicle to trail the towing vehicle around curves or over irregularities of the road surface without putting any strain upon the connecting device between them. As a result of this the device of the present invention may be made relatively small and light, so much so that for vehicles of ordinary size the driver of the towing vehicle upon reaching his destination may remove the device of the present invention and carry it as hand baggage with him back to his original point of departure without undue effort or trouble.

Figure 5:
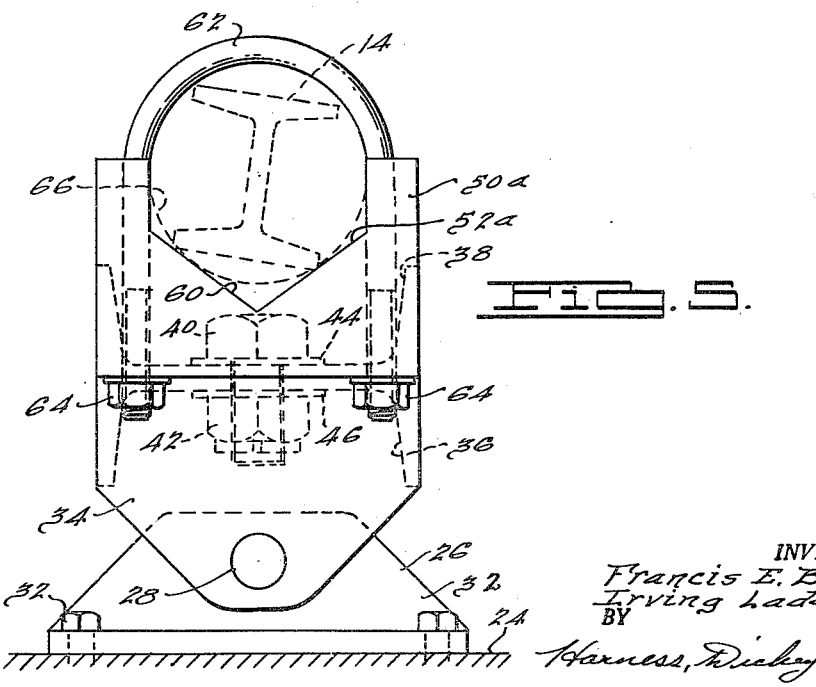

In Figs. 4 and 5 a slightly modified form of construction is shown. The modification in this case is in connection only with the shape of the notches in the members 50 and the method of clamping the axle in place therein. All of the remaining parts being identical to the construction first described they are illustrated by the same numerals and only the changed parts are indicated by different numerals and a description of the changed parts only is required to fully describe the entire construction.

In the case shown in Figs. 4 and 5 the plate members 50a corresponding to the plate members 50 first described are each provided with notches 52a therein corresponding to the notches 52 first described, but in this case the bottom walls or edges of the notches 52a form an upwardly opening V, indicated at 60, and instead of employing clamping bars such as 54 and straight bolts such as 56 in the first-described construction, a U bolt 62 is employed in conjunction with each plate member 50a. The U bolt 62 has its opposite side portions spaced in accordance with the spacing of the bolts 56 first described and may be projected through the same holes in the web of the member 38 and below such web receive nuts 64 thereon. This form of construction may receive an I-beam type of front axle 14 within the notches 52a, as indicated in dotted lines in Fig. 5, or it may receive a tubular circularly sectioned type of front axle such as illustrated by dotted lines 66 in Fig. 5, the U bolts 62 in either case being drawn down by the nut 64 to clamp the axle down against the V portions 60 at the bottom of the notches 52a. The construction shown in Figs. 4 and 5, of course, operates in identically the same manner as the construction first described.

Having thus described our invention what we claim by Letters Patent is:

1. A vehicle towing device of the character described comprising, in combination, bracket means adapted to be secured to a towing vehicle providing a pair of laterally spaced pintles, a plate member pivotally mounted upon each of said pintles, an angularly sectioned member having a flat upper face interposed between and fixed to said plate members, a second angularly sectioned member having a flat lower face arranged in flat contacting relationship with respect to said flat face of said first-mentioned angularly sectioned member, means forming a pivotal connection between said angularly sectioned members about an axis perpendicular to said faces thereof, a plate member fixed to each end of said second-mentioned angularly sectioned member and provided with an axle receiving notch therein, and clamping means associated with said second-mentioned angularly sectioned member arranged to clamp an axle within said notches.

2. A vehicle towing device comprising, in combination, bracket means adapted to be secured to a towing vehicle, an inverted channel sectioned member, plates fixed to the opposite ends of said channel sectioned member and projecting downwardly therefrom, a shaft pivotally connecting said bracket means with said plate members for relative pivotal movement about a normally horizontal axis, an upwardly opening channel sectioned member arranged in flat contacting relationship to the upper face of the first-mentioned channel sectioned member and pivotally connected thereto for movement about an axis perpendicular to the contacting faces of said channel sectioned members, plates fixed to the opposite ends of the second-mentioned channel sectioned member, the last-mentioned plates having axle receiving notches therein, and clamping means associated with said second-mentioned channel sectioned member adapted for clamping an axle within said notches.

3. A vehicle towing device adapted to be secured to the rear end of a towing vehicle comprising, in combination, a horizontally directed shaft adapted to extend transversely of the length of the towing vehicle, a bracket member fixed to said shaft adjacent to but inwardly spaced from each end thereof, a pair of parallel plate members arranged with their planes of thickness perpendicular to the axis of said shaft, one of said plate members being pivotally mounted upon one end of said shaft and the other said plate member being pivotally mounted upon the other end of said shaft, a downwardly opening channel sectioned member interposed between the upper ends of said plate members and rigidly fixed thereto, an upwardly opening channel sectioned member arranged in flat contacting relationship with respect to the upper face of the first mentioned channel sectioned member, means pivotally connecting said channel sectioned members together for relative movement about an axis perpendicular to the contacting faces thereof, a plate member fixed to each end of second-mentioned channel sectioned member outwardly of the plates fixed to the ends of the first-mentioned channel sectioned member, each of the last-mentioned plate members being provided with an axle receiving notch opening onto the upper edge thereof, and clamping means cooperating with said second-mentioned channel member operable to draw an axle into clamping relation with respect to the walls of said notches.

4. A vehicle towing device adapted to be secured to the rear end of a towing vehicle comprising, in combination, a horizontally directed shaft adapted to extend transversely of the length of the towing vehicle, a bracket member fixed to said shaft adjacent to but inwardly spaced from each end thereof, a pair of parallel plate members arranged with their planes of thickness perpendicular to the axis of said shaft, one of said plate members being pivotally mounted upon one end of said shaft and the other said plate member being pivotally mounted upon the other end of said shaft, a downwardly opening channel sectioned member interposed between the upper ends of said plate members and rigidly fixed thereto, an upwardly opening channel sectioned member arranged in flat contacting relationship with respect to the upper face of the first-mentioned channel sectioned member, means pivotally connecting said channel sectioned members together for relative movement about an axis perpendicular to the contacting faces thereof, a plate member fixed to each end of second-mentioned channel sectioned member outwardly of the plates fixed to the ends of the first-mentioned channel sectioned member, each of the last-mentioned plate members being provided with an axle receiving notch opening onto the upper edge thereof, and clamping means cooperating with said second-mentioned channel member operable to draw an axle into clamping relation with respect to the walls of said notches, said notches each having a bottom edge and side edges the latter arranged in perpendicular relationship with respect to said bottom edge, and said bottom edges being arranged at an angle to the horizontal when the pivotal axis between said channel sectioned members is approximately vertical whereby to correspond with the approximate angularity of a towed vehicle supported thereby, with respect to the ground.

5. A vehicle towing device adapted to be secured to the rear end of a towing vehicle comprising, in combination, a horizontally directed shaft adapted to extend transversely of the length of the towing vehicle, a bracket member fixed to said shaft adjacent to but inwardly spaced from each end thereof, a pair of parallel plate members arranged with their planes of thickness perpendicular to the axis of said shaft, one of said plate members being pivotally mounted upon one end of said shaft and the other said plate member being pivotally mounted upon the other end of said shaft, a downwardly opening channel sectioned member interposed between the upper ends of said plate members and rigidly fixed thereto, an upwardly opening channel sectioned member arranged in flat contacting relationship with respect to the upper face of the first-mentioned channel sectioned member, means pivotally connecting said channel sectioned members together for relative movement about an axis perpendicular to the contacting faces thereof, a plate member fixed to each end of second-mentioned channel sectioned member outwardly of the plates fixed to the ends of the first-mentioned channel sectioned member, each of the last-mentioned plate members being provided with an axle receiving notch opening onto the upper edge thereof, and clamping means cooperating with said second-mentioned channel member operable to draw an axle into clamping relation with respect to the walls of said notches, each of said notches having a V-shaped bottom portion adapted for the reception of the axle of a towed vehicle.

FRANCIS E. BLAIR.
IRVING LADA.